US011208138B2

(12) United States Patent
Nozawa et al.

(10) Patent No.: US 11,208,138 B2
(45) Date of Patent: Dec. 28, 2021

(54) STEERING APPARATUS

(71) Applicant: JTEKT CORPORATION, Osaka (JP)

(72) Inventors: Yasuyuki Nozawa, Kashihara (JP);
Takeshi Watanabe, Kashihara (JP);
Norihiro Ochi, Nara (JP); Ryoichi Tokioka, Kashiba (JP); Kei Kitahara, Shiki-gun (JP); Yousuke Nishimura, Kariya (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 17/043,132

(22) PCT Filed: Mar. 15, 2019

(86) PCT No.: PCT/JP2019/010968
§ 371 (c)(1),
(2) Date: Sep. 29, 2020

(87) PCT Pub. No.: WO2019/193956
PCT Pub. Date: Oct. 10, 2019

(65) Prior Publication Data
US 2021/0016820 A1    Jan. 21, 2021

(30) Foreign Application Priority Data

Apr. 4, 2018   (JP) .............................. JP2018-072636

(51) Int. Cl.
*B62D 1/183*   (2006.01)
*B62D 1/181*   (2006.01)
(Continued)

(52) U.S. Cl.
CPC ............... *B62D 1/183* (2013.01); *B62D 1/04* (2013.01); *B62D 1/181* (2013.01); *B62D 1/189* (2013.01)

(58) Field of Classification Search
CPC ........ B62D 5/00; B62D 5/001; B62D 5/0445; B62D 1/183; B62D 1/181; B62D 1/185; B62D 1/187; B62D 1/189
See application file for complete search history.

(56) References Cited

U.S. PATENT DOCUMENTS 10,343,706 B2 *   7/2019   Lubischer ................ B62D 1/19
2015/0096405 A1   4/2015   Hoock
(Continued)

FOREIGN PATENT DOCUMENTS

CN   112109796 A   * 12/2020
DE   102019209680 A1 *  1/2020   ............... B62D 5/04
(Continued)

OTHER PUBLICATIONS

May 14, 2019 International Search Report issued in International Patent Application No. PCT/JP2019/010968.

*Primary Examiner* — Paul N Dickson
*Assistant Examiner* — Matthew D Lee
(74) *Attorney, Agent, or Firm* — Oliff PLC

(57) ABSTRACT

A steering apparatus for use in steering a vehicle includes: a movable body to which an input device is attached, the movable body configured to move back and forth in an extend-retract direction between a first position closer to the front of the vehicle and a second position closer to the driver; an intermediate guide that guides the movable body in the extend-retract direction, and moves back and forth in the extend-retract direction; a base guide that is attached to the vehicle and guides the intermediate guide in the extend-retract direction; a first extend-retract mechanism including an extend-retract drive source that causes the intermediate guide to move back and forth relative to the base guide; and a second extend-retract mechanism that causes the movable body to move back and forth relative to the intermediate
(Continued)

guide by using driving force of the extend-retract drive source.

9 Claims, 10 Drawing Sheets

(51) Int. Cl.
  *B62D 1/04* (2006.01)
  *B62D 1/189* (2006.01)

(56) References Cited

U.S. PATENT DOCUMENTS

| | | | |
|---|---|---|---|
| 2017/0029009 A1* | 2/2017 | Rouleau | B62D 1/183 |
| 2017/0334452 A1 | 11/2017 | Abe et al. | |
| 2018/0370559 A1* | 12/2018 | Swamidason | B62D 1/181 |
| 2019/0084609 A1* | 3/2019 | Rogers | B62D 1/187 |
| 2019/0118852 A1* | 4/2019 | Suzuki | B60T 7/042 |
| 2019/0210633 A1* | 7/2019 | Derocher | B62D 1/183 |
| 2019/0241205 A1* | 8/2019 | Toyama | B62D 1/183 |
| 2019/0308655 A1* | 10/2019 | Ochi | B60K 37/02 |
| 2020/0094757 A1* | 3/2020 | Murray | B60K 28/04 |
| 2020/0101998 A1* | 4/2020 | Nishimura | B62D 1/183 |
| 2020/0283054 A1* | 9/2020 | Murayama | B62D 1/10 |
| 2021/0016820 A1* | 1/2021 | Nozawa | B62D 1/181 |
| 2021/0031822 A1* | 2/2021 | Watanabe | B62D 1/181 |
| 2021/0061340 A1* | 3/2021 | Wilkes | B62D 1/181 |
| 2021/0129891 A1* | 5/2021 | Ryne | B62D 1/181 |
| 2021/0129896 A1* | 5/2021 | Ryne | B62D 1/187 |
| 2021/0213997 A1* | 7/2021 | Watanabe | B62D 6/00 |
| 2021/0229733 A1* | 7/2021 | Kurokawa | B62D 1/187 |
| 2021/0237791 A1* | 8/2021 | Geiselberger | B62D 1/195 |

FOREIGN PATENT DOCUMENTS

| | | | | |
|---|---|---|---|---|
| DE | 102019106334 A1 * | 9/2020 | | B62D 1/183 |
| DE | 102019112875 A1 * | 11/2020 | | B62D 1/105 |
| EP | 1721806 A2 * | 11/2006 | | B62D 1/187 |
| EP | 3730381 A1 * | 10/2020 | | B60R 21/203 |
| FR | 2806042 A1 * | 9/2001 | | B62D 1/183 |
| JP | H03-038448 U | 4/1991 | | |
| JP | H03-098179 U | 10/1991 | | |
| JP | H04-007282 U | 1/1992 | | |
| JP | H11-255045 A | 9/1999 | | |
| JP | 2000-344113 A | 12/2000 | | |
| JP | 2002-193111 A | 7/2002 | | |
| JP | 2003-118591 A | 4/2003 | | |
| JP | 2007-83809 A | 4/2007 | | |
| JP | 2016-130036 A | 7/2016 | | |
| JP | 2017-206153 A | 11/2017 | | |
| WO | WO-03020572 A1 * | 3/2003 | | B60R 25/0227 |
| WO | WO-2020193542 A1 * | 10/2020 | | B62D 1/185 |

* cited by examiner

STEERING APPARATUS

TECHNICAL FIELD

The present invention relates to a steering apparatus that can alter the position and orientation of an input device, such as a steering wheel, to provide more room in front of the driver.

BACKGROUND ART

In level 3 and higher autonomous driving in which the system takes complete control over the driving, there is no requirement for the driver to take control over the operation of the vehicle, and so it is not necessary for the driver to hold the steering wheel. If the steering wheel could be moved to create more room in front of the driver during autonomous driving, this would improve the comfort level of the driver. In view of this, a technique has been proposed whereby the steering wheel is retracted into a retraction area in the front of the vehicle (for example, see Patent Literature (PTL) 1).

CITATION LIST

Patent Literature

[PTL 1] Japanese Unexamined Patent Application Publication No. 2003-118591

SUMMARY OF INVENTION

Technical Problems

Conventionally, the steering column is provided with a telescopic mechanism that allows the driver to finely adjust the steering wheel to a position that it suitable for the driver's physique. A technique that increases the moveable range of the telescopic mechanism so that the steering wheel can be positioned as far away from the driver as possible during autonomous driving has also been proposed.

However, since the telescopic mechanism needs to be able to extend the length of the stroke between the two positions that the steering wheel moves between, locations in which such a telescopic mechanism can be attached are limited.

Moreover, when the moveable range of the telescopic mechanism is increased, the time it takes to retract and extend the steering wheel increases, whereby the transfer of control from the system to the driver when the vehicle switches from autonomous driving to manual driving cannot be completed in a short period of time.

The present invention was conceived in view of the above problems, and has an object to provide a steering apparatus that can quickly extend and retract and is compact when the input device, such as a steering wheel, is in a retracted state.

Solution to Problem

In order to achieve the above object, A steering apparatus according to one aspect of the present invention is for use in steering a vehicle, and includes: a movable body to which an input device is attached, the movable body configured to move back and forth in an extend-retract direction between a first position and a second position, the first position being closer to a front of the vehicle than the second position is, the second position being closer to a driver than the first position is; an intermediate guide that guides the movable body in the extend-retract direction, and moves back and forth in the extend-retract direction; a base guide that is attached to the vehicle and guides the intermediate guide in the extend-retract direction; a first extend-retract mechanism including an extend-retract drive source that causes the intermediate guide to move back and forth relative to the base guide; and a second extend-retract mechanism that causes the movable body to move back and forth relative to the intermediate guide by using driving force of the extend-retract drive source or a drive source other than the extend-retract drive source.

Advantageous Effects of Invention

According to the present invention, it is possible to increase the stroke between the extended and retracted positions of the input device, and secure a spacious amount of room in front of the driver. Moreover, since the steering apparatus is compact when the input device is in the retracted state, it possible to reduce the amount of space required to install the steering apparatus in the vehicle. Furthermore, the input device can be quickly extended and retracted since the movable body and the intermediate guide have relatively short strokes and are ganged.

DESCRIPTION OF EMBODIMENTS

Hereinafter, embodiments of the steering apparatus according to the present invention are described with reference to the drawings. Each of the embodiments described below shows a general or specific example. The numerical values, shapes, materials, elements, the arrangement and connection of the elements, steps, the processing order of the steps etc., shown in the following embodiments are mere examples, and therefore do not limit the present invention.

Among elements in the following embodiments, those not recited in any one of the independent claims defining the broadest aspect are described as optional elements.

The drawings are schematic drawings in which emphasis, omission, and ratio adjustment are made as appropriate to illustrate the invention, and may differ from actual shapes, positional relationships, and ratios.

Embodiment 1

Figure 1:
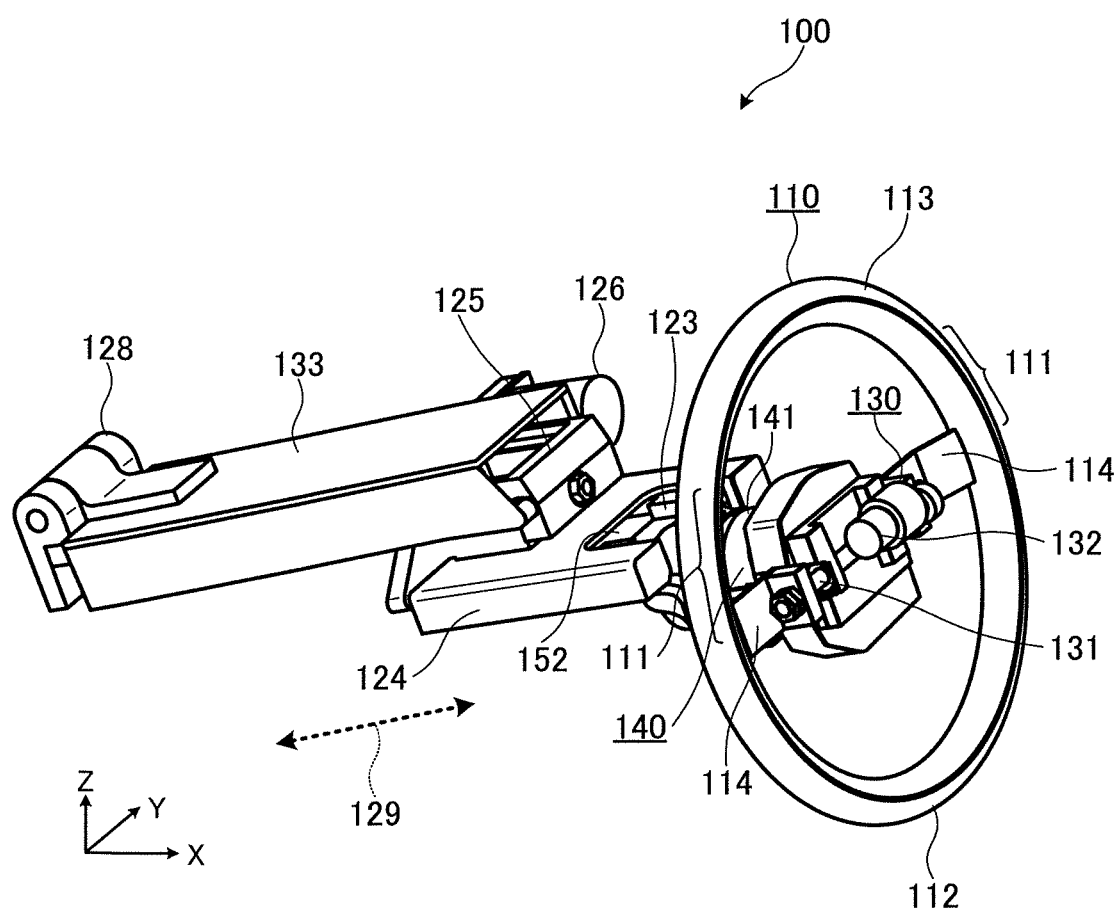
FIG. 1 is a perspective view of a steering apparatus according to Embodiment 1.
Figure 2:
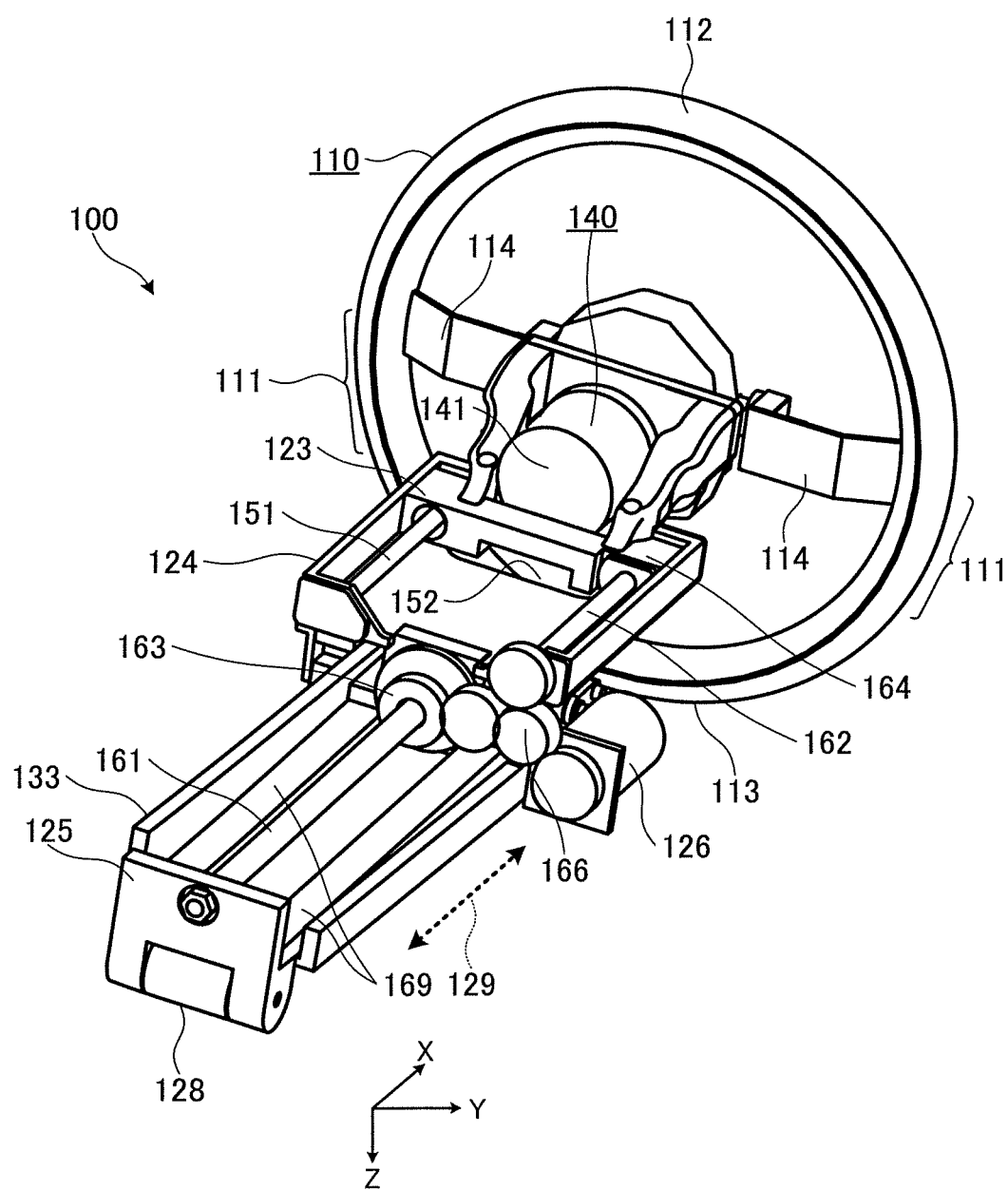
FIG. 2 is a perspective view of the steering apparatus according to Embodiment 1, as viewed from the bottom and the side that faces the front of the vehicle.

FIG. 1 is a perspective view of a steering apparatus, as viewed from the top and the side that faces the driver. FIG. 2 is a perspective view of the steering apparatus, as viewed from the bottom and the side that faces the front of the vehicle. Steering apparatus 100 is a device attached to a vehicle, such as an automobile, a bus, a truck, construction equipment, or agricultural equipment, capable of switching between manual driving and autonomous driving. Steering apparatus 100 includes input device 110, movable body 123, intermediate guide 124, base guide 125, first extend-retract mechanism 121, and second extend-retract mechanism 122. In Embodiment 1, steering apparatus 100 further includes folding mechanism 130 and reaction-force generating device 140. Steering apparatus 100 is a component in what is known as a steer-by-wire system. In such a system, input device 110 and the wheels are not mechanically connected. Instead, steering apparatus 100 outputs information indicating the steering wheel angle of input device 110 to cause a motor to turn the wheels and steer the vehicle.

Input device 110 is what is generally referred to as a steering wheel, which is operated by the driver during manual driving to impart an angle (steering angle) to the wheels of the vehicle. Input device 110 includes two straight-driving grip portions 111 and lower coupling portion 112. In Embodiment 1, input device 110 is annular in shape and further includes upper coupling portion 113 and connecting portions 114.

Straight-driving grip portions 111 are arranged so as to be easily gripped by the respective hands of the driver when input device 110 is oriented so as to drive the vehicle straight in manual driving. Portions of the input device 110 each located in a range of an angle about the steering axis of approximately 30 degrees upward from a horizontal plane containing the center of rotation of input device 110 correspond to the straight-driving grip portions 111.

Lower coupling portion 112 is a portion that couples the two straight-driving grip portions 111, and is curved so as to protrude downward. In Embodiment 1, lower coupling portion 112 is curved in a semicircular arc shape.

Upper coupling portion 113 is a portion that couples the two straight-driving grip portions 111, and is curved so as to protrude upward. In Embodiment 1, upper coupling portion 113 is curved in a partial arc shape.

Lower coupling portion 112 and upper coupling portion 113 can be gripped by the driver during manual driving to steer the vehicle. Accordingly, the driver can choose any position to place his or her hand to steer the vehicle, which improves the ease of steering and improves safety by reducing erroneous steering inputs. When input device 110 is annular in shape, its structural strength as a whole is increased, and since there are no acutely projecting portions, this improves the safety of the driver in the event of a secondary collision.

Input device 110 is described as being divided into the two straight-driving grip portions 111, lower coupling portion 112, and upper coupling portion 113. However, because input device 110 is annular in shape, it is difficult to definitely differentiate between the two straight-driving grip portions 111, lower coupling portion 112, and upper coupling portion 113.

Input device 110 is not limited to being annular in shape, and may alternatively be elliptical, an elongated circle, polygonal, or any combination thereof. Lower coupling portion 112 and upper coupling portion 113 are described as being curved. As used within the written description and the appended claims, the term "curved" includes shapes that include straight lines and corners, such as a portion of a polygon.

Connecting portions 114 connect input device 110 and folding mechanism 130 together, and hold input device 110 in place such that the center of the outer circumference of input device 110 is located on the steering axis. In Embodiment 1, connecting portions 114 are components that protrude from the lower end portions of the two straight-driving grip portions 111 toward the steering axis of input device 110, and extend along a diameter of input device 110.

Note that the shape, arrangement, orientation, etc., of connecting portions 114 are not limited to example illustrated in the figures, and may be set discretionarily.

Movable body 123 is a component to which input device 110 is attached. Movable body 123 moves back and forth in extend-retract direction 129 between a first position closer to the front of the vehicle and a second position closer to the driver. In Embodiment 1, input device 110 is attached to movable body 123 via reaction-force generating device 140 and folding mechanism 130. Although the shape and structure of movable body 123 are not particularly limited, in Embodiment 1, movable body 123 is sized so as to be accommodated within the box-shaped intermediate guide 124. Movable body 123 extending in extend-retract direction 129 inside intermediate guide 124 can move back and forth in extend-retract direction 129 along linear guide 151 fixed to intermediate guide 124.

Intermediate guide 124 is a component that guides movable body 123 in extend-retract direction 129. Intermediate guide 124 itself also moves back and forth in extend-retract direction 129. In a state in which intermediate guide 124 is positioned at the end portion of base guide 125 on the driver's side, intermediate guide 124 protrudes farther than base guide 125 does in the direction toward the driver. This allows movable body 123 to extend and retract over a distance that is greater than or equal to the length of base guide 125.

Although the shape and structure of intermediate guide 124 are not particularly limited, in Embodiment 1, intermediate guide 124 has the shape of a rectangular box, and houses linear guide 151 that extends in extend-retract direction 129. The top panel of the box-shaped intermediate guide 124 includes notch 152 into which part of reaction-force generating device 140 fits when input device 110 is in the retracted state. Notch 152 is a slit-like portion extending through the top panel of intermediate guide 124 in its thickness direction. The box-shaped intermediate guide 124 is sized to accommodate part of reaction-force generating device 140 when input device 110 is in the retracted state. This configuration provides a compact steering apparatus 100 when input device 110 is in the retracted state, in particular in regard to size in the vertical directions.

Figure 4:
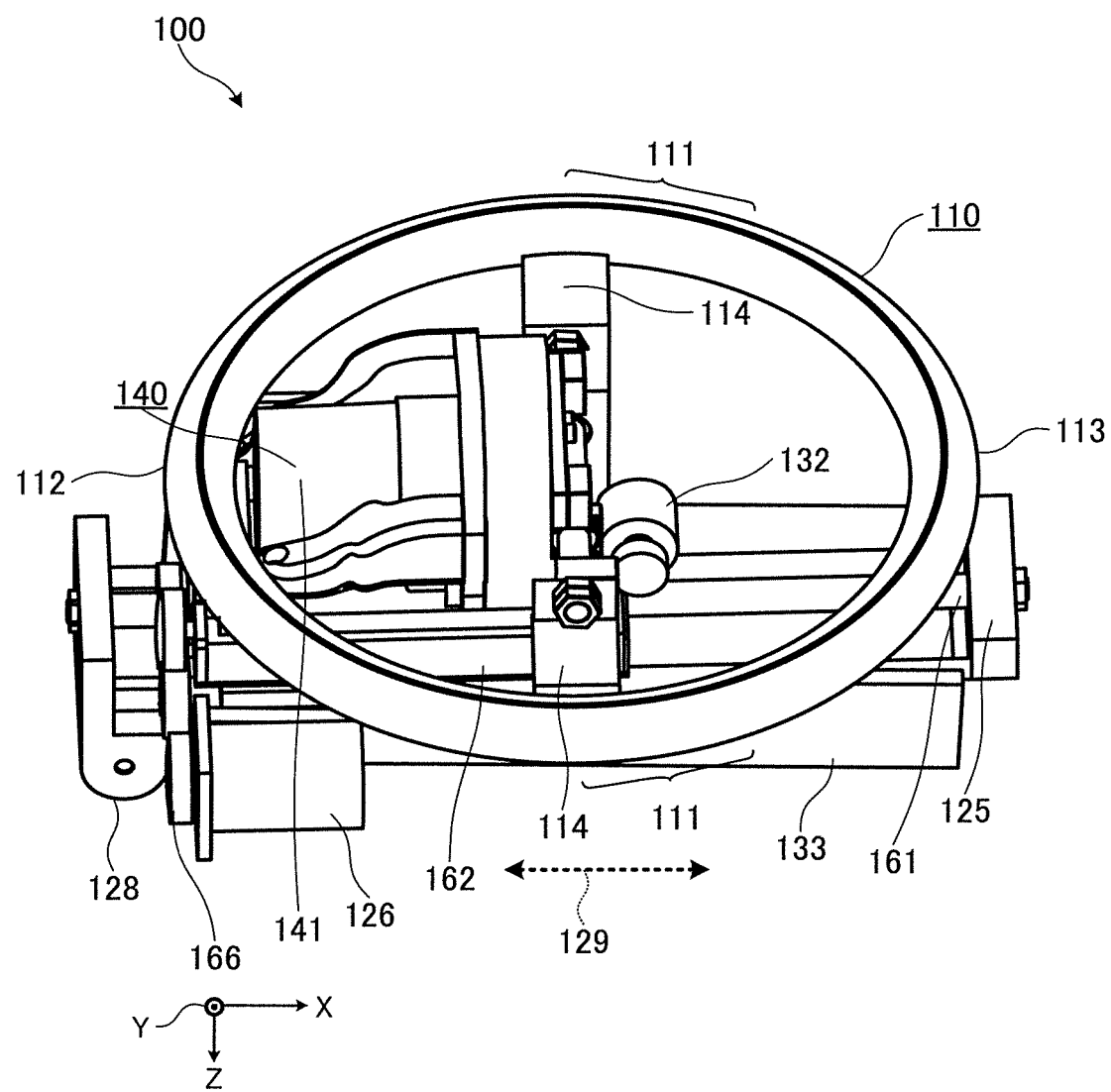
FIG. 4 is a perspective view of the steering apparatus according to Embodiment 1 in a compacted state, as viewed from the bottom and a lateral side of the vehicle.

Base guide 125 is a component that is attached to the vehicle, and guides intermediate guide 124 in extend-retract direction 129. Although the shape and structure of base guide 125 are not particularly limited, in Embodiment 1, base guide 125 is longer than each of movable body 123 and intermediate guide 124 in extend-retract direction 129, and as illustrated in FIG. 4, is approximately equal to or slightly longer than the diameter of the annular input device 110. This configuration provides a compact steering apparatus 100 when input device 110 is in the retracted state, in other words, in a state in which steering apparatus 100 is compacted as much as possible, in particular in regard to size in extend-retract direction 129, since the length of steering apparatus 100 in extend-retract direction 129 is approximately equal to the length of base guide 125 in extend-retract direction 129. Base guide 125 includes two rails 169 that guide intermediate guide 124 in extend-retract direction 129, and inhibit rotation of intermediate guide 124 about an axis extending in extend-retract direction 129.

In Embodiment 1, base guide 125 is attached to the vehicle via hinge 128 and bracket 133. Base guide 125 uses a tilt mechanism that is fixed to the vehicle in extend-retract direction 129 and tilts about hinge 128.

First extend-retract mechanism 121 is a mechanism that moves intermediate guide 124 back and forth relative to base guide 125, and includes extend-retract drive source 126. Although the structure of first extend-retract mechanism 121 is not particularly limited, in Embodiment 1, a ball screw in which first threaded shaft 161 and first nut 163 move linearly relative to one another is used as first extend-retract mechanism 121. First extend-retract mechanism 121 uses driving-force transmission mechanism 166 to which a driving force produced by extend-retract drive source 126 is transmitted.

First threaded shaft 161 is a shaft provided with a helical groove in its outer circumferential surface and extends in extend-retract direction 129. First threaded shaft 161 is fixed to base guide 125 such that first threaded shaft 161 does not move in extend-retract direction 129 or a direction of rotation about an axis extending in extend-retract direction 129.

First nut 163 is a component that engages with the helical groove in the outer circumferential surface of first threaded shaft 161 inserted through first nut 163 with balls provided between first nut 163 and first threaded shaft 161. First nut 163 is attached to an end surface of intermediate guide 124 such that first nut 163 is fixed in extend-retract direction 129 but rotates in a direction of rotation about an axis extending in extend-retract direction 129. First nut 163 is attached to intermediate guide 124 so as to project toward base guide 125. First threaded shaft 161 is inserted through first nut 163 to project outward from intermediate guide 124.

Extend-retract drive source 126 imparts a rotational driving force to first nut 163 via driving-force transmission mechanism 166. Rotating first nut 163 backward and forward moves intermediate guide 124 back and forth relative first threaded shaft 161 extending in extend-retract direction 129. Since rotation of intermediate guide 124 is restricted by rails 169 in base guide 125, intermediate guide 124 is not rotated by rotation of first nut 163.

No particular limitation is imposed on driving-force transmission mechanism 166, and any mechanism that imparts a rotational driving force to first nut 163 can be used as driving-force transmission mechanism 166. Examples of mechanisms that can be used as driving-force transmission mechanism 166 include a belt drive, and a combination of gears. In Embodiment 1, a combination of gears is used. Although no particular limitation is imposed on extend-retract drive source 126, in Embodiment 1, an electric motor is used which generates force that drives both intermediate guide 124 and movable body 123 in extend-retract direction 129.

Second extend-retract mechanism 122 is a mechanism that uses the driving force produced by extend-retract drive source 126 to move movable body 123 back and forth in conjunction with the back and forth movement of intermediate guide 124. Although the structure of second extend-retract mechanism 122 is not particularly limited, in Embodiment 1, a ball screw in which second threaded shaft 162 and second nut 164 move linearly relative to one another is used as second extend-retract mechanism 122.

Second threaded shaft 162 is a shaft provided with a helical groove in its outer circumferential surface, similar to first threaded shaft 161. Second threaded shaft 162 extends in extend-retract direction 129 and is attached to intermediate guide 124 such that second threaded shaft 162 is fixed in extend-retract direction 129 but rotates about an axis extending in extend-retract direction 129 relative to intermediate guide 124.

Second nut 164 is a component that engages with the groove of second threaded shaft 162 inserted through second nut 164 with balls provided therebetween, and is fixed to an end surface of movable body 123. Second nut 164 accommodated in intermediate guide 124 is attached to movable body 123. With this configuration, as a result of second extend-retract mechanism 122 rotating second threaded shaft 162 rotatably attached to intermediate guide 124, second nut 164 into which second threaded shaft 162 is inserted can move back and forth in extend-retract direction 129, and movable body 123 moves back and forth relative to intermediate guide 124 along with second nut 164.

The rotational driving force is imparted by extend-retract drive source 126 to second threaded shaft 162 as well as to first nut 163 via driving-force transmission mechanism 166. In other words, movement of second threaded shaft 162 and first nut 163 is linked.

In Embodiment 1, ball screws are used for both first extend-retract mechanism 121 and second extend-retract mechanism 122, as described above. This allows not only smooth extension and retraction of input device 110 by extend-retract drive source 126, but also manual extension and retraction of input device 110.

Folding mechanism 130 is a mechanism that is attached to movable body 123, and causes input device 110 to fold relative to movable body 123 by rotating input device 110 about a folding axis (extending in the Y-axis direction in the drawings), which is an axis intersecting extend-retract direction 129.

Folding mechanism 130 rotates the entire input device 110 about the folding axis (extending in the Y-axis direction in the drawings) relative to movable body 123, such that lower coupling portion 112 is directed toward the front of the vehicle. Although the structure of folding mechanism 130 is not particularly limited, in Embodiment 1, folding mechanism 130 includes folding shaft 131 and folding drive source 132.

Folding shaft 131 is a rod-shaped component arranged on or parallel to the diameter of input device 110. In Embodiment 1, folding shaft 131 is disposed horizontally and is rotatably fixed to movable body 123. The ends of connecting portions 114 of input device 110 are fixedly attached to the respective end portions of folding shaft 131.

Folding drive source 132 generates power that rotates folding shaft 131 about its axis, which rotates and folds input device 110 via folding shaft 131, relative to movable body 123. In Embodiment 1, an electric motor is used as folding drive source 132.

Reaction-force generating device 140 is a device that applies torque to input device 110 against the force applied by the driver, when the driver turns input device 110 to steer the vehicle. Reaction-force generating device 140 is a device that reproduces, for example, a feel of force necessary for the driver to steer a conventional vehicle in which the wheels and the input device are mechanically connected. In Embodiment 1, reaction-force generating device 140 includes reaction-force motor 141 interposed between movable body 123 and folding mechanism 130. Reaction-force generating device 140 may include a speed reducer.

Figure 5:
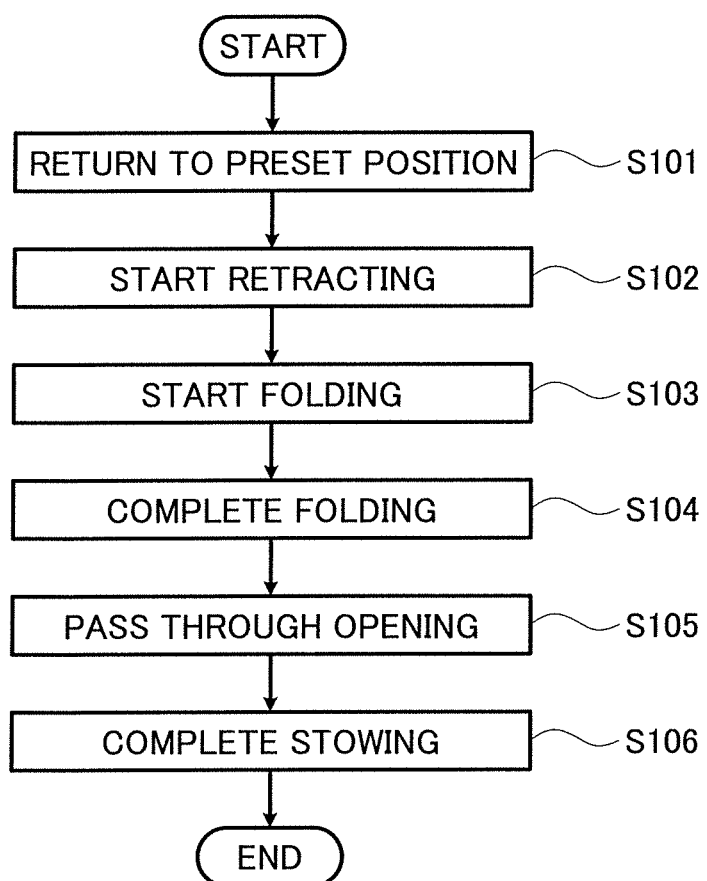
FIG. 5 is a flowchart illustrating a flow of operations performed by the steering apparatus according to Embodiment 1 to stow the extended input device inside the dashboard.

Next, operations performed by steering apparatus 100 attached to the vehicle will be described. FIG. 5 is a flowchart illustrating a flow of operations performed by the steering apparatus to stow the extended input device inside the dashboard.

Figure 6:
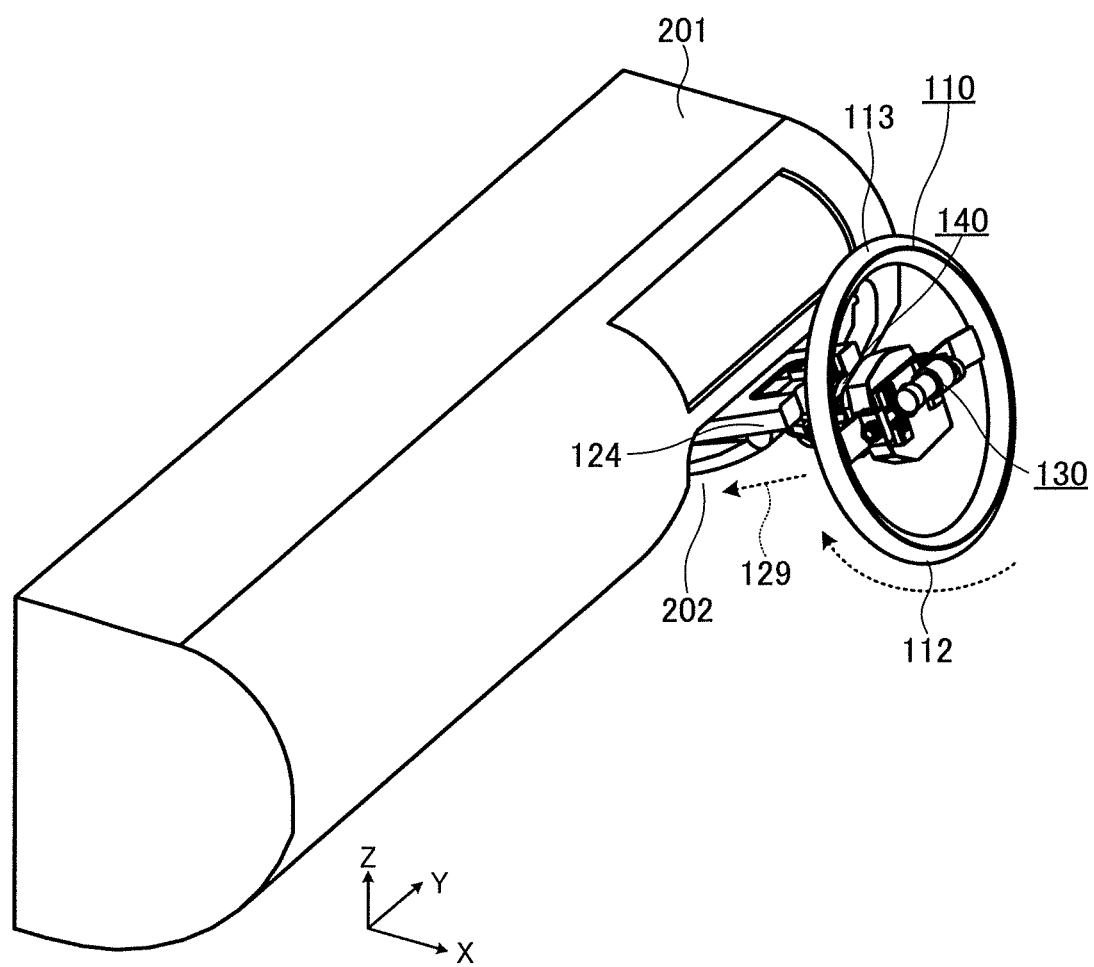
FIG. 6 is a perspective view of the steering apparatus according to Embodiment 1 in which the input device is projecting toward the driver in an extended state, and the dashboard.

When information indicating a change from manual driving to autonomous driving is received by steering apparatus 100, input device 110 projecting toward the driver in the extended state is returned to a preset position, as illustrated in FIG. 6 (S101). Although the preset position is not limited, the preset position in Embodiment 1 is an orientation of input device 110 for causing the vehicle to travel straight ahead during manual driving. This preset position is also known as the center position. Input device 110 is rotationally moved by reaction-force generating device 140 back to the preset position. Input device 110 may be locked by a locking mechanism or the like at the preset position.

Next, extend-retract drive source 126 is driven to cause intermediate guide 124 and movable body 123 to work together to start retraction of input device 110 (S102).

Next, folding mechanism 130 is driven to start folding input device 110 relative to movable body 123 by rotating input device 110 about the axis intersecting extend-retract direction 129 (S103).

A temporal order of returning input device 110 to the preset position, starting retraction of input device 110, and starting folding input device 110 is not limited to the order described above and may be changed or, alternatively, at least two of them may be performed concurrently. The retraction and the folding may be performed within a same period of time. The retraction may be started after input device 110 has been folded. Starting the retraction of input device 110 earlier than the folding can reduce the possibility of interference between the driver and upper coupling portion 113 of input device 110 that is being folded.

Figure 3:
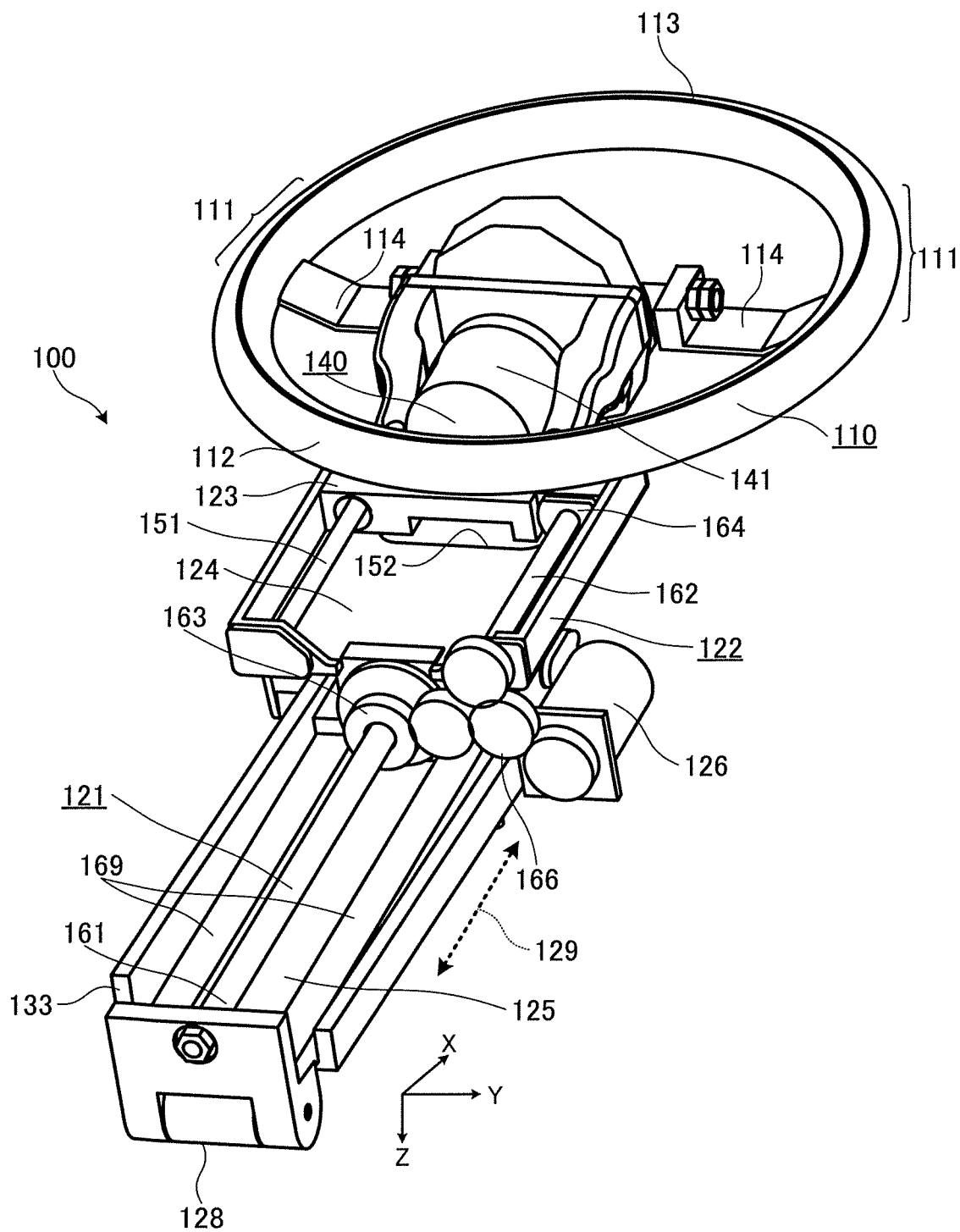
FIG. 3 is a perspective view of the steering apparatus according to Embodiment 1, in which an input device is folded.
Figure 7:
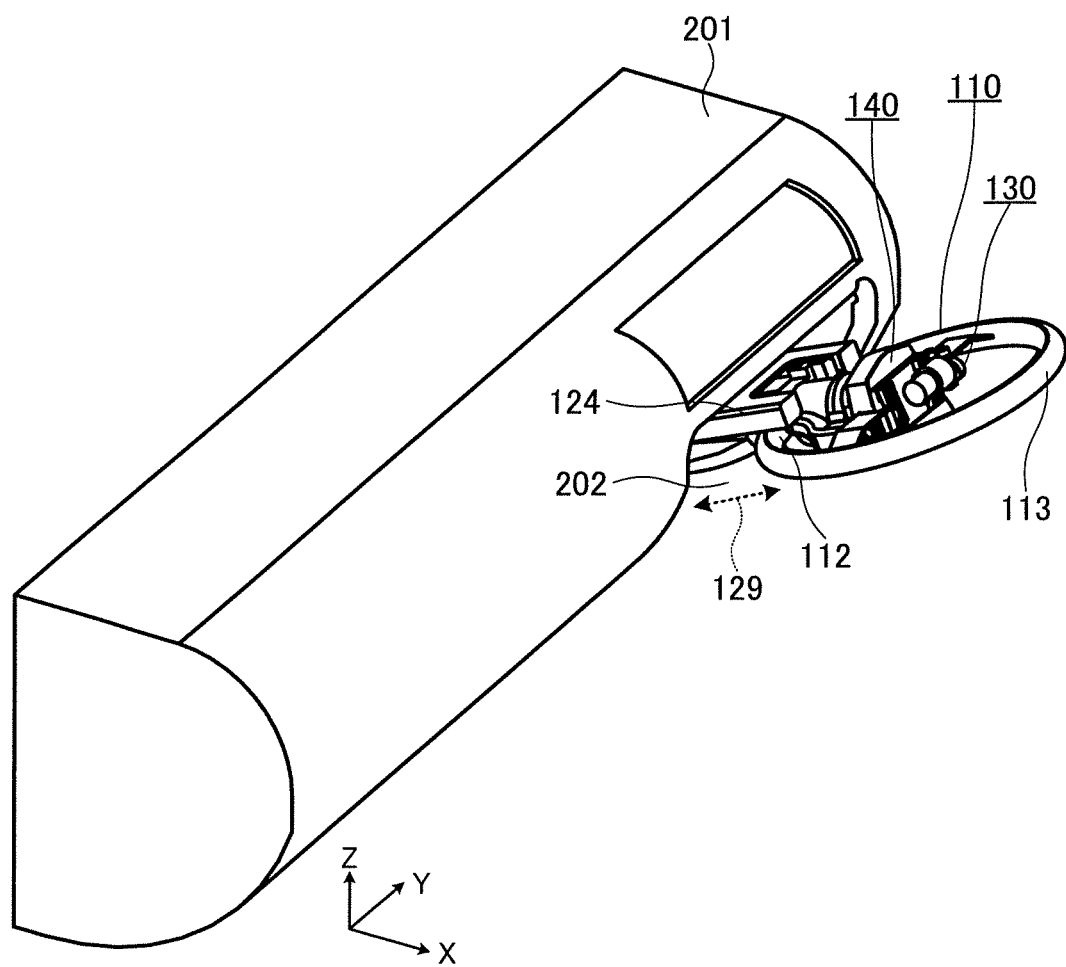
FIG. 7 is a perspective view of the input device according to Embodiment 1 as it starts being stowed into the dashboard.

Next, folding mechanism 130 completes folding input device 110 before input device 110 is inserted into dashboard 201 (S104). Although the angle at which input device 110 is folded is not particularly limited, in Embodiment 1, folding mechanism 130 is driven by folding drive source 132 to rotate folding shaft 131 so that input device 110 is rotated and folded until a plane including straight-driving grip portions 111 and lower coupling portion 112 is parallel or approximately parallel to extend-retract direction 129, as illustrated in FIG. 3 and FIG. 7. By folding input device 110 in this manner, a projected area of input device 110 on dashboard 201 in extend-retract direction 129 can be reduced. This leads to a reduced area of opening 202 through which input device 110 passes when stowing input device 110 into dashboard 201. As a result, it is possible to improve the appearance of dashboard 201 while inhibiting a decrease in structural strength of dashboard 201.

With input device 110 folded to be parallel or approximately parallel to extend-retract direction 129, reaction-force generating device 140 is arranged so as to be within a space surrounded by straight-driving grip portions 111 and lower coupling portion 112. Therefore, input device 110 can be folded until input device 110 is parallel or approximately parallel to extend-retract direction 129. When stowing input device 110 into dashboard 201, reaction-force generating device 140 can also pass through a part of opening 202 in dashboard 201 and through which input device 110 passes. Because it is not necessary to increase the size of opening 202, an increase in the size of opening 202 can be inhibited. Furthermore, steering apparatus 100 can be compactly stowed in dashboard 201.

Figure 8:
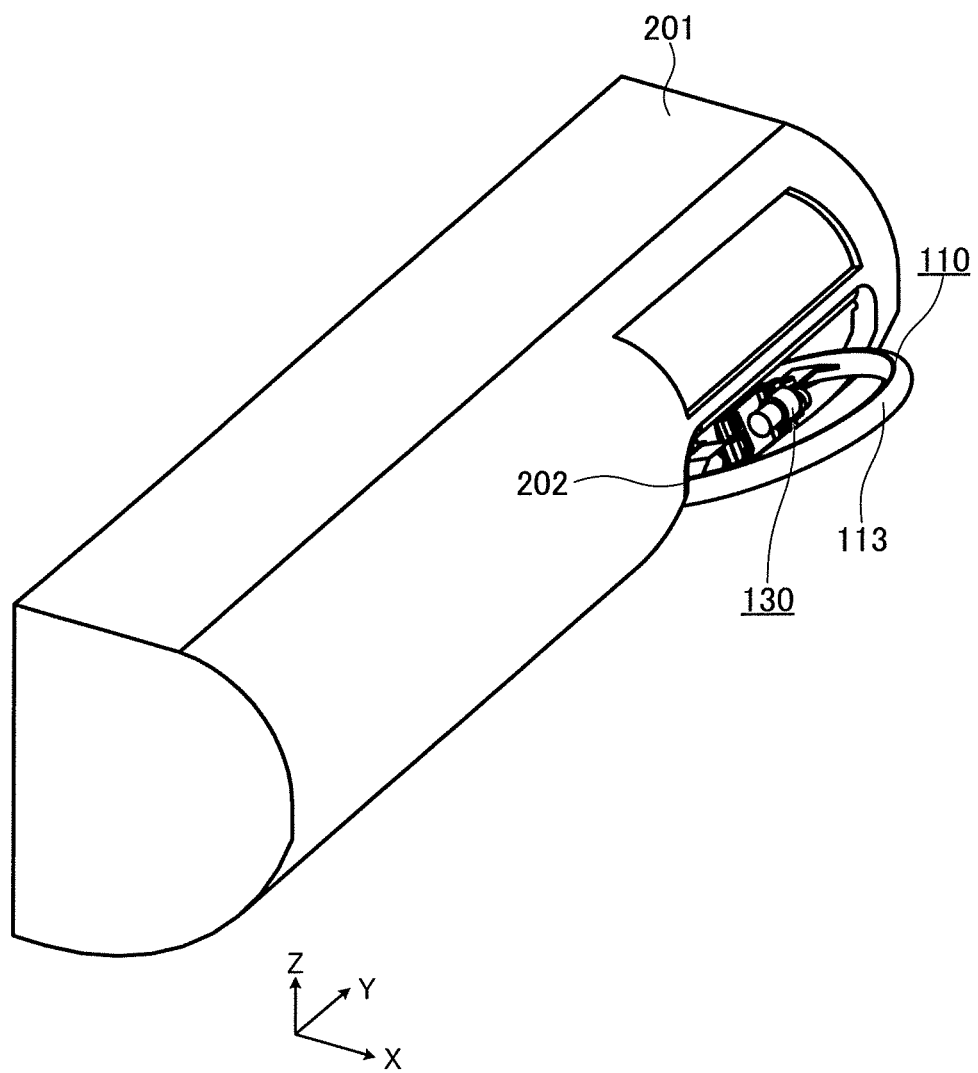
FIG. 8 is a perspective view of the input device according to Embodiment 1 nearing completion of its stowing into the dashboard.

Next, intermediate guide 124 and movable body 123 are further retracted to cause input device 110 that has been folded, reaction-force generating device 140, and folding mechanism 130 to pass through opening 202 of dashboard 201, as illustrated in FIG. 8 (S105).

Lastly, when input device 110, including upper coupling portion 113, has been stowed in dashboard 201, steering apparatus 100 stops the retraction to complete the stowing of input device 110 (S106).

The steering apparatus performs the above-described operations in a reverse order to cause the stowed input device 110 to extend out from dashboard 201. While the input device 110 is extending out or when extension of input device 110 is complete, steering apparatus 100 obtains a steering angle steered by autonomous driving and determines a steering wheel angle based on the steering angle. Reaction-force generating device 140 may rotate input device 110 about the steering axis so that input device 110 achieves a rotation angle corresponding to the steering wheel angle. Smooth transition from autonomous driving to manual driving can thus be achieved without inconveniency to the driver.

With Embodiment 1, as a result of steering apparatus 100 including intermediate guide 124, steering apparatus 100 can secure sufficient stroke for input device 110 even when the length of base guide 125 in extend-retract direction 129 is shortened. When steering apparatus 100 is in a compacted state like in FIG. 4, intermediate guide 124, movable body 123, input device 110, folding mechanism 130, and reaction-force generating device 140 are accommodated within base guide 125 in extend-retract direction 129. As a result, steering apparatus 100 can be arranged in dashboard 201 even when there is little space in dashboard 201. This allows for a greater degree of freedom in designing dashboard 201.

Since movable body 123 and intermediate guide 124 extend and retract together, the time it takes to extend input device 110 and the time it takes to retract input device 110 can be reduced.

Even when input device 110 is a large annular device that is relatively easier for the driver to steer with during manual driving, such an input device 110 can be compactly stowed in dashboard 201 during autonomous driving. This makes it possible to provide a spacious amount of room in front of the driver, which improves the comfort level of the driver. Input device 110 may be retracted upon the driver entering or exiting the vehicle to make it easier for the driver to enter or exit the vehicle.

Because a relatively large input device 110 can be distanced from the driver during autonomous driving, erroneous steering inputs can be prevented to ensure safety.

The area of opening 202 in dashboard 201 can be reduced even when the shape of the handle is designed freely, such as increasing the size of input device 110 and providing lower coupling portion 112 and upper coupling portion 113 on input device 110. This also allows for larger meters and displays and the like to be used in dashboard 201, and allows for a greater degree of freedom in regard to the shape of dashboard 201.

As a result of steering apparatus 100 including intermediate guide 124, steering apparatus 100 can secure sufficient stroke for input device 110 even when the length of base guide 125 in extend-retract direction 129 is shortened. When steering apparatus 100 is in a compacted state like in FIG. 4, intermediate guide 124, movable body 123, input device 110, folding mechanism 130, and reaction-force generating device 140 are accommodated within base guide 125 in extend-retract direction 129. As a result, steering apparatus 100 can be arranged in dashboard 201 even when there is little space in dashboard 201. This allows for a greater degree of freedom in designing dashboard 201.

Since movable body 123 and intermediate guide 124 extend and retract together, the time it takes to extend input device 110 and the time it takes to retract input device 110 can be reduced.

Even when input device 110 is a large annular device that is relatively easier for the driver to steer with during manual driving, such an input device 110 can be compactly stowed in dashboard 201 during autonomous driving. This makes it possible to provide a spacious amount of room in front of the driver, which improves the comfort level of the driver. Input device 110 may be retracted upon the driver entering or exiting the vehicle to make it easier for the driver to enter or exit the vehicle.

Because a relatively large input device 110 can be distanced from the driver during autonomous driving, erroneous steering inputs can be prevented to ensure safety.

The area of opening 202 in dashboard 201 can be reduced even when the shape of the handle is designed freely, such as increasing the size of input device 110 and providing lower coupling portion 112 and upper coupling portion 113 on input device 110. This also allows for larger meters and displays and the like to be used in dashboard 201, and allows for a greater degree of freedom in regard to the shape of dashboard 201.

Embodiment 2

Next, another embodiment of steering apparatus 100 will be described. Parts that have the same operation and functions as in Embodiment 1, and parts that have the same shapes, mechanisms, structures as in Embodiment 1 share like reference signs, and repeated description thereof may be omitted. The following will focus on the points of difference with Embodiment 1, and description of overlapping content may be omitted.

Figure 9:
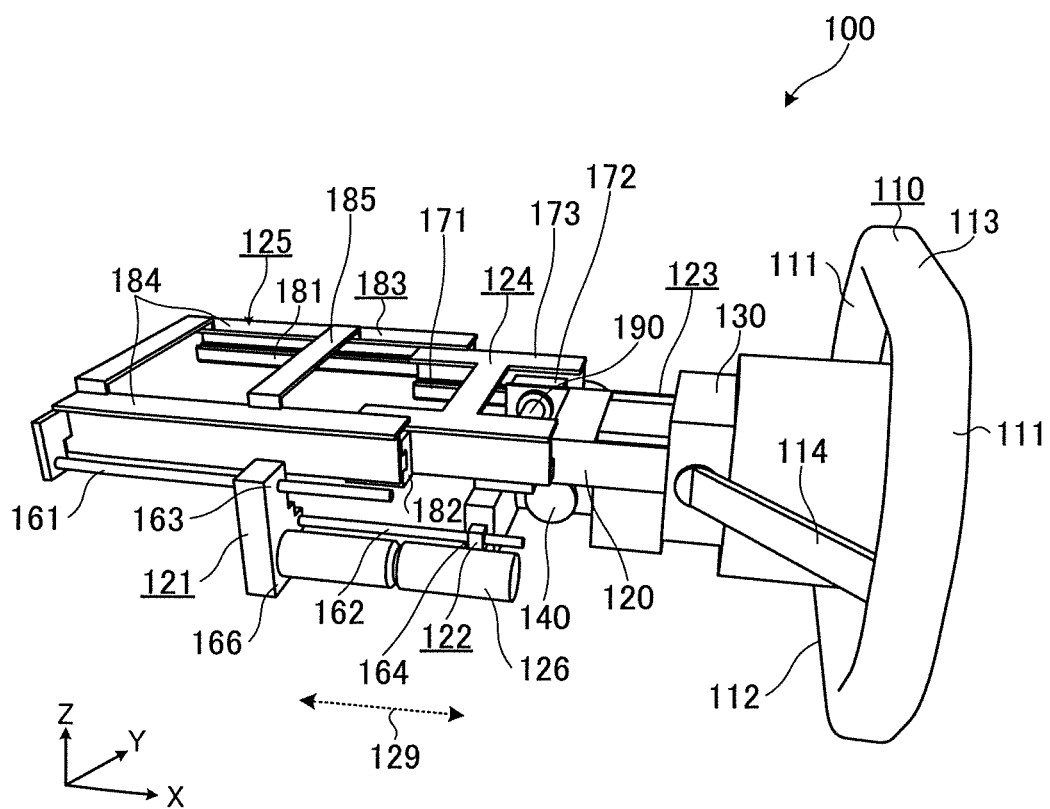
FIG. 9 is a perspective view of a steering apparatus according to Embodiment 2.
Figure 10:
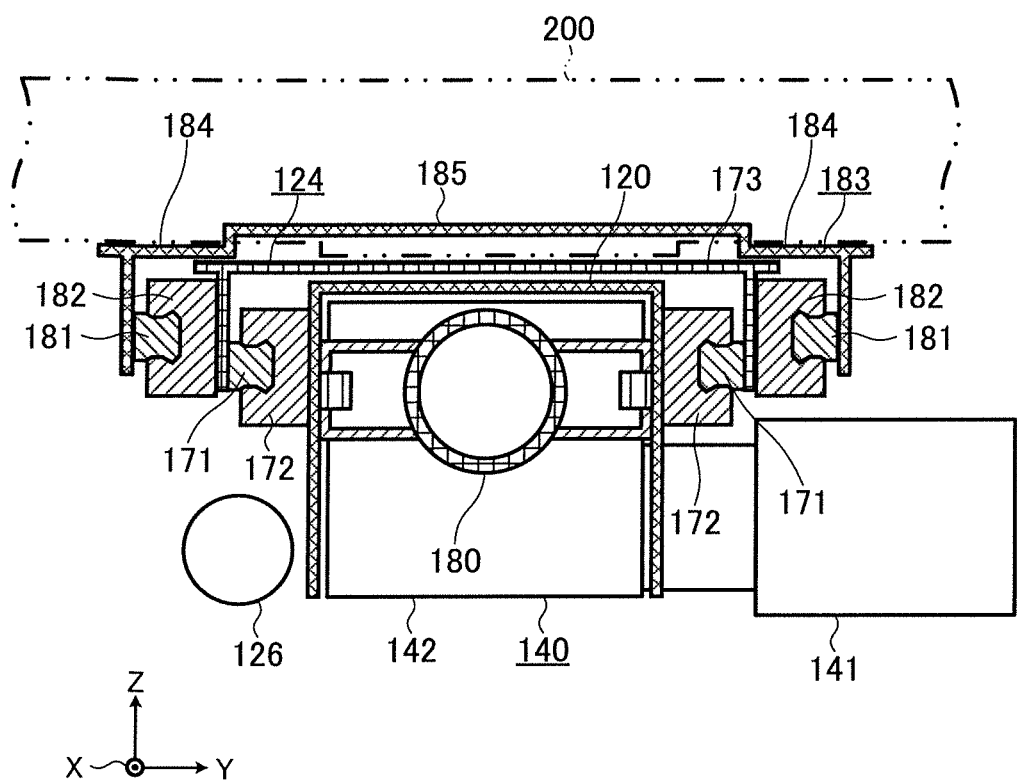
FIG. 10 is a cross sectional view illustrating the relative arrangement of intermediate rails and base rails according to Embodiment 2.

FIG. 9 is a perspective view of a steering apparatus according to Embodiment 2, as viewed from the top and the side that faces the driver. FIG. 10 is a cross sectional view of the steering apparatus according to Embodiment 2 in a compacted state, taken in the vicinity of the reaction-force generating device. Just like steering apparatus 100 according to Embodiment 1, steering apparatus 100 according to Embodiment 2 is a steering apparatus that is attached to a vehicle, and includes input device 110, movable body 123, intermediate guide 124, base guide 125, first extend-retract mechanism 121, second extend-retract mechanism 122, folding mechanism 130, and reaction-force generating device 140. Steering apparatus 100, in which input device 110 and the wheels are not mechanically connected, outputs information indicating the steering wheel angle of input device 110 to cause a motor to turn the wheels and steer the vehicle.

Input device 110 according to Embodiment 2 has an octagonal flattened annular shape with rounded corners, and includes two linear straight-driving grip portions 111, lower coupling portion 112, and upper coupling portion 113. Input device 110 is connected to folding mechanism 130 by connecting portions 114 that gradually incline in the extending direction along extend-retract direction 129 as they widen in the width direction from folding mechanism 130.

Intermediate guide 124 according to Embodiment 2 includes intermediate rails 171, intermediate blocks 172, and intermediate frame 173.

Intermediate rails 171 are rod-shaped components that extend in extend-retract direction 129. Although the shapes of intermediate rails 171 are not particularly limited, in Embodiment 2, intermediate rails 171 have the shape of a rod having a rectangular cross section. The two opposing side surfaces of each intermediate rail 171 each include a lengthwise groove that engages with balls included in intermediate block 172. The pair of intermediate rails 171 are arranged such that one intermediate rail 171 is provided on one side of movable shaft 180 in the width direction (the Y-axis direction in the drawings) and the other intermediate rail 171 is provided on the other side of movable shaft 180 in the width direction. Although intermediate rails 171 are configured of components having the same shape that are disposed symmetrically in the present embodiment, intermediate rails 171 may have mutually different shapes.

Each intermediate block 172 is a component that is guided by intermediate rail 171 on the sides of intermediate rail 171. The shapes and structures of intermediate blocks 172 are not particularly limited, but in Embodiment 2, each intermediate block 172 includes a plurality of balls that roll between the grooves in intermediate rail 171 and the main body of intermediate block 172. Each intermediate block 172 includes an abutting portion, which is the path along which intermediate block 172 moves as the balls abutting intermediate rail 171 roll, and a recirculation portion, which is the path along which balls ejected from the abutting portion by the movement of intermediate block 172 are returned back to the abutting portion. Intermediate blocks 172 are attached so that each intermediate block 172 opposes a corresponding intermediate rail 171. Movable frame 120 included in movable body 123 is attached to the surfaces of the pair of intermediate blocks 172 that are oriented facing each other, so as to bridge the pair of intermediate blocks 172 together.

In Embodiment 2, intermediate rail 171 and intermediate block 172 form what is known as a linear guide where the balls are recirculated, but the linear mechanism included in intermediate guide 124 is not limited to this example. For example, intermediate guide 124 may have a ball slide structure in which balls are rotatably fixed to intermediate block 172, and, alternatively, may have a slide structure in which balls are not included and intermediate block 172 and intermediate rail 171 slide while in surface contact with one another.

Intermediate frame 173 is a component that is attached to a pair of base blocks 182 included in base guide 125 (to be described later) so as to bridge the pair of base blocks 182 together, and holds the pair of intermediate rails 171 so that the pair of intermediate rails 171 extend in extend-retract direction 129.

Base guide 125 according to Embodiment 2 includes base rails 181, base blocks 182, and base frame 183.

Base rails 181 are rod-shaped components that extend in extend-retract direction 129. Although the shapes of base rails 181 are not particularly limited, in Embodiment 2, components having the same shapes as intermediate rails 171 are used. The pair of base rails 181 are disposed outward of the pair of intermediate rails 171 in the width direction (the Y-axis direction in the drawings). Base rails 181 are arranged such that a portion of the smallest region of an imaginary cuboid that includes intermediate rails 171 is included in the smallest region of an imaginary cuboid that includes the pair of base rails 181. By arranging base rails 181 and intermediate rails 171 in this manner, the entire region in which base rails 181 are disposed and the entire region in which intermediate rails 171 extend and retract can be formed slim. This makes it possible to easily secure space for input device 110 to be folded and arranged below intermediate rail 171.

Each base block 182 is a component that is guided by base rail 181 on the sides of base rail 181. Although the shapes and structures of base blocks 182 are not particularly limited, in Embodiment 2, the same components as intermediate blocks 172 are used for base blocks 182. Base blocks 182 are attached so that each base block 182 opposes a corresponding base rail 181. Intermediate frame 173 is attached to the surfaces of the pair of base blocks 182 that are oriented facing each other, so as to bridge the pair of base blocks 182 together. Moreover, intermediate rails 171 are attached to the surfaces of the pair of base blocks 182 that are oriented facing each other via intermediate frame 173 interposed therebetween.

Base frame 183 is a component that is attached to the vehicle chassis and holds the pair of base rails 181 so that the pair of base rails 181 extend in extend-retract direction 129. In Embodiment 2, base frame 183 includes rail holding portions 184 that hold the pair of base rails 181, and base bridge portion 185 that couples the pair of base rails 181 via rail holding portions 184. Base bridge portion 185 is disposed, relative to the smallest region of an imaginary cuboid that includes rail holding portions 184, projecting on a side opposite to the side on which base rails 181 are located. In a state in which steering apparatus 100 is attached to the vehicle chassis, base bridge portion 185 is arranged so as to at least partially overlap chassis beam 200, which is part of the vehicle chassis and extends crosswise of the vehicle, in a view in extend-retract direction 129, as illustrated in FIG. 10. With this, base frame 183 can be disposed as high up as possible without causing interference between intermediate frame 173 or movable shaft 180 and base bridge portion 185 when intermediate frame 173 and movable shaft 180 move in extend-retract direction 129. This allows for the fulcrum point of tilt mechanism 190 to be disposed higher. This also allows for a greater degree of freedom when arranging surrounding components such as speed reducer 142. Even when chassis beam 200 includes a projecting part, it is possible to dispose base frame 183 as high up as possible and still avoid interference with the projecting part. This makes it possible to increase the size of the space for accommodating input device 110 as much as possible, and widen the gap between the region through which input device 110 passes and the driver's legs as much as possible.

Movable body 123 according to Embodiment 2 includes movable shaft 180 that couples reaction-force generating device 140 and input device 110. Movable shaft 180 is a tubular component disposed so that the axis of the tube extends along extend-retract direction 129 and disposed so as to overlap at least part of the smallest region of an imaginary cuboid that includes the pair of intermediate rails 171. Movable shaft 180 is further disposed so as to overlap at least part of the smallest region of an imaginary cuboid that includes the pair of base rails 181. As illustrated in FIG. 10, movable shaft 180 is connected to reaction-force motor 141 via speed reducer 142. Reaction-force motor 141 is disposed in a location so that the axis of rotation of reaction-force motor 141 does not intersect the smallest region of an imaginary cuboid that includes the pair of intermediate rails 171. Arranging movable shaft 180 and reaction-force motor 141 in this manner allows for a slim steering apparatus 100, which allows for a greater degree of freedom when arranging steering apparatus 100 in the vehicle chassis.

In Embodiment 2, movable body 123 is connected to intermediate blocks 172 of intermediate guide 124 via tilt mechanism 190 (see FIG. 9). Tilt mechanism 190 is configured of a combination of a motor and mechanical components, and, based on an input signal, causes the entire movable body 123 to tilt relative to intermediate guide 124 such that input device 110 moves up or down. This makes it possible to reduce the size of the motor and/or speed reducer included in tilt mechanism 190, which makes it possible to accommodate tilt mechanism 190 in the inner region of steering apparatus 100 and reduce the size of the entire steering apparatus 100. This also makes it possible to increase the rigidity of steering apparatus 100 compared to when the entire steering apparatus 100 is tilted. When steering apparatus 100 is in an extended state, only movable body 123 projecting from dashboard 201 (see, for example, FIG. 6) is tilted. This makes it possible to increase the range over which movable body 123 can be tilted. This also makes it possible to tilt movable body 123 and avoid interference in positions in which movable body 123 interferes with the vehicle chassis when retracting steering apparatus 100.

Embodiment 2 makes it possible to achieve an overall slim steering apparatus 100 by arranging intermediate rails 171 and base rails 181 so as to overlap in an imaginary plane. This allows for disposing steering apparatus 100 with a high degree of freedom in the confined space between chassis beam 200 and a driver's legs or knees, while maintaining a long enough stroke (long enough slide) that allows input device 110, which the driver operates during manual driving, to be stowed in dashboard 201. This furthermore makes it possible to secure a large space at the driver's footing in a state in which input device 110 is stowed within dashboard 201.

By making base rails 181 the longest, the rigidity of steering apparatus 100 can be increased while ensuring a long stroke (long-slide). This makes it possible to ensure stability when the driver is operating input device 110 and ensure stability when extending and retracting movable body 123.

The invention is not limited to Embodiments 1 and 2 described above. For example, other embodiments may be implemented by combining elements described in the specification as desired or by eliminating one or more of the elements. Variations of the embodiments obtained by making various modifications that may occur to those skilled in the art without departing from the purport of the invention or, in other words, within the scope limited by the terms of the appended claims, are also encompassed in the invention.

For example, in Embodiments 1 and 2, steering apparatus 100 is described as an apparatus that extends and retracts in two stages. However, steering apparatus 100 may be an apparatus that includes a first intermediate guide and a second intermediate guide, for example, and extends and retracts in three or more stages.

Folding mechanism 130 may be a mechanism that does not include folding drive source 132 but rotates in response to an operation by a driver. Folding mechanism 130 may be a mechanism that rotates input device 110 relative to movable body 123 by utilizing a driving force applied by first extend-retract mechanism 121 and second extend-retract mechanism 122 to retract the input device 110.

First extend-retract mechanism 121 and second extend-retract mechanism 122 are not necessarily multistage extending and retracting mechanism that include intermediate guide 124. First extend-retract mechanism 121 and second extend-retract mechanism 122 may alternatively be implemented as parallel link mechanisms, such as pantograph mechanisms.

First extend-retract mechanism 121 and second extend-retract mechanism 122 are described as operating concurrently as a result of being driven by a single extend-retract drive source 126, but first extend-retract mechanism 121 and second extend-retract mechanism 122 may include individual drive sources.

INDUSTRIAL APPLICABILITY

The present invention is applicable to, for example, a vehicle, such as an automobile, a bus, a truck, agricultural equipment, or construction equipment, having wheels or a crawler or the like, and capable of manual driving and autonomous driving.

The invention claimed is:

1. A steering apparatus for use in steering a vehicle, the steering apparatus comprising:
    a movable body to which an input device is attached, the movable body configured to move back and forth in an extend-retract direction between a first position and a second position, the first position being closer to a front of the vehicle than the second position is, the second position being closer to a driver than the first position is;
    an intermediate guide that guides the movable body in the extend-retract direction, and moves back and forth in the extend-retract direction;
    a base guide that is attached to the vehicle and guides the intermediate guide in the extend-retract direction;
    a first extend-retract mechanism including an extend-retract drive source that causes the intermediate guide to move back and forth relative to the base guide; and
    a second extend-retract mechanism that causes the movable body to move back and forth relative to the intermediate guide by using driving force of the extend-retract drive source or a drive source other than the extend-retract drive source.

2. The steering apparatus according to claim 1,
    wherein the input device is a steering wheel, and
    the steering apparatus further comprises a folding mechanism that is connected to the movable body and rotates the input device about a folding axis that intersects the extend-retract direction.

3. The steering apparatus according to claim 2,
    wherein the input device is annular in shape,
    the folding mechanism is connected to the movable body via a reaction-force generating device, and
    at least part of the reaction-force generating device is stored inside the input device in a state in which the input device has been folded by the folding mechanism.

4. The steering apparatus according to claim 3,
    wherein the intermediate guide accommodates part of the reaction-force generating device when the input device is in a retracted state, and includes a notch into which part of the reaction-force generating device fits when the input device is in the retracted state.

5. The steering apparatus according to claim 1,
    wherein the intermediate guide includes a pair of intermediate rails that extend in the extend-retract direction, and intermediate blocks guided by the pair of intermediate rails,
    the base guide includes a pair of base rails that extend in the extend-retract direction, and base blocks that are guided by the pair of base rails and to which the pair of intermediate rails are attached, and
    the pair of intermediate rails and the pair of base rails are arranged such that a smallest region of a cuboid including the pair of intermediate rails and a smallest region of a cuboid including the pair of base rails at least partially overlap.

6. The steering apparatus according to claim 5,
    wherein the movable body further includes:
        a movable shaft to which the input device is attached; and
        a reaction-force generating device that generates a reaction force applied to the input device via the movable shaft,
    wherein the movable shaft and the smallest region of the cuboid including the pair of intermediate rails at least partially overlap.

7. The steering apparatus according to claim 5,
    wherein the base guide includes a base frame including a base bridge portion that couples the pair of base rails, and
    the base bridge portion is disposed at least partially overlapping a chassis beam in a view in the extend-retract direction, the chassis beam being part of a vehicle chassis and extending crosswise of the vehicle.

8. The steering apparatus according to claim 1, further comprising:
    a tilt mechanism that causes the movable body to tilt relative to the intermediate guide to move the input device up and down.

9. The steering apparatus according to claim 6,
    wherein the base guide includes a base frame including a base bridge portion that couples the pair of base rails, and
    the base bridge portion is disposed at least partially overlapping a chassis beam in a view in the extend-retract direction, the chassis beam being part of a vehicle chassis and extending crosswise of the vehicle.

* * * * *